US012540062B2

(12) United States Patent
Bouyssoux

(10) Patent No.: US 12,540,062 B2
(45) Date of Patent: Feb. 3, 2026

(54) LOAD-HANDLING VEHICLE

(71) Applicant: MANITOU BF, Ancenis (FR)

(72) Inventor: François Bouyssoux, Acenis (FR)

(73) Assignee: MANITOU BF, Ancenis (FR)

( * ) Notice: Subject to any disclaimer, the term of this patent is extended or adjusted under 35 U.S.C. 154(b) by 486 days.

(21) Appl. No.: 18/004,268

(22) PCT Filed: Jun. 18, 2021

(86) PCT No.: PCT/FR2021/051105
§ 371 (c)(1),
(2) Date: Jan. 4, 2023

(87) PCT Pub. No.: WO2022/008813
PCT Pub. Date: Jan. 13, 2022

(65) Prior Publication Data

US 2023/0271817 A1 Aug. 31, 2023

(30) Foreign Application Priority Data

Jul. 7, 2020 (FR) ........................................ 2007174

(51) Int. Cl.
*B66F 9/06* (2006.01)
*B66F 9/065* (2006.01)
*B66F 9/22* (2006.01)

(52) U.S. Cl.
CPC ................ *B66F 9/065* (2013.01); *B66F 9/22* (2013.01)

(58) Field of Classification Search
CPC .. F15B 11/024; F15B 2211/3058; B66F 9/22; B66F 9/0655
See application file for complete search history.

(56) References Cited

U.S. PATENT DOCUMENTS 4,953,723 A * 9/1990 Saotome ............... B66C 13/066 91/437

FOREIGN PATENT DOCUMENTS

DE 1406784 A1 4/1969
EP 0172524 A2 2/1986
(Continued)

OTHER PUBLICATIONS

International Search Report dated Oct. 5, 2021 for International Patent Application No. PCT/FR2021/051105.
(Continued)

*Primary Examiner* — Abiy Teka
(74) *Attorney, Agent, or Firm* — Husch Blackwell LLP

(57) ABSTRACT

A load-handling vehicle comprising a load-handling member, a jack for lifting the load-handling member, and a fluid source is provided. The jack may include a lifting chamber and a lowering chamber. The fluid source may be coupled to the lifting chamber and the lowering chamber at a first fluid connection and a second fluid connection, respectively. The first fluid connection may comprise a safety valve normally open in a direction of the flow from the fluid source toward the lifting chamber and normally closed in a direction of flow from the lifting chamber toward the fluid source. A pressure-sensitive valve arranged on the second fluid connection may be controlled in response to the pressure between the safety valve and the fluid source. Additionally, a unidirectional fluid circulation line may fluidly couple the first fluid connection and the second fluid connection.

17 Claims, 4 Drawing Sheets

(56) References Cited

FOREIGN PATENT DOCUMENTS

| | | | | | |
|---|---|---|---|---|---|
| EP | 2786958 | A1 | * | 10/2014 | ............ F15B 11/003 |
| EP | 3527833 | B1 | * | 10/2020 | ............ F15B 11/024 |

OTHER PUBLICATIONS

Written Opinion of the International Searching Authority dated Oct. 5, 2021 for International Patent Application No. PCT/FR2021/051105.

* cited by examiner

LOAD-HANDLING VEHICLE

FIELD OF THE INVENTION

The present invention concerns a load-handling vehicle.

BACKGROUND

It concerns in particular a load-handling vehicle including a load-handling device including at least:

- a load-handling member,
- a hydraulic ram for raising the or at least one of the load-handling members, said lifting ram including a lifting chamber and a lowering chamber,
- a source of hydraulic fluid including at least one hydraulic fluid distribution system and a reservoir,
- a first fluid connection connecting the lifting chamber of the lifting ram with said source of hydraulic fluid,
- a second fluid connection connecting the lowering chamber of the lifting ram with said source of hydraulic fluid,
- the first fluid connection including a safety valve open in the direction of circulation of fluid from the source of hydraulic fluid to the lifting chamber and normally closed in the direction of circulation from the lifting chamber to the source of hydraulic fluid, to retain a driving load.

Load-handling vehicles of the aforementioned type are known. An example of a vehicle of this type is described in the patent US2004/00221717. In modern load-handling vehicles the lifting speed of the load-handling member does not vary as a function of the load. A consequence of this is not being able to optimize the cycle times of a task consisting in raising the empty load-handling member in order to recover a load placed at height. Other load-handling vehicles are also known such as those described in the documents DE 1406784, U.S. Pat. No. 4,953,723 and EP 0172524.

SUMMARY

An object of the invention is to propose a handling vehicle in which the design of the load-handling device enables the lifting speed of the empty load-handling member to be increased.

To this end the invention has for object a load-handling vehicle including a load-handling device including at least:

- a load-handling member,
- a hydraulic ram for raising the or at least one of the load-handling members, said lifting ram including a lifting chamber and a lowering chamber,
- a source of hydraulic fluid including at least one hydraulic fluid distribution system and a reservoir,
- a first fluid connection connecting the lifting chamber of the lifting ram with said source of hydraulic fluid,
- a second fluid connection connecting the lowering chamber of the lifting ram with said source of hydraulic fluid,
- the first fluid connection including a safety valve open in the direction of circulation of fluid from the source of hydraulic fluid to the lifting chamber and normally closed in the direction of circulation from the lifting chamber to the source of hydraulic fluid,
- characterized in that the load-handling device includes a pressure-sensitive valve disposed on the second fluid connection, this valve being configured to go from the closed position to the open position as a function of the pressure in the portion of the first fluid connection extending between the safety valve and the source of hydraulic fluid, the load-handling device further including a unidirectional fluid circulation line that can be blocked connecting the first and second fluid connections for looped circulation of fluid from the lowering chamber to the lifting chamber in the open state of said line, the member for blocking said line being configured to be moved between an open position and a closed position as a function of the pressure in the portion of the second fluid connection between the valve and the source of hydraulic fluid. The presence of a circuit for resupplying the lifting chamber of the ram with fluid enables the raising speed of the empty load-handling member to be increased. This results in improved cycle times under certain working conditions.

In accordance with one embodiment of the invention, the pressure-sensitive valve disposed on the second fluid connection is a proportional valve. The proportional valve therefore enables lifting under load without jerks.

In accordance with one embodiment of the invention, the pressure-sensitive valve disposed on the second fluid connection is configured to go from the closed position to the open position when the pressure in the portion of the first fluid connection extending between the safety valve and the source of fluid is greater than a predetermined value.

In accordance with one embodiment of the invention, the member for blocking the unidirectional fluid circulation line is configured to go from the open position to the closed position when the pressure in the portion of the second fluid connection extending between the valve and the source of hydraulic fluid is greater than a predetermined value. This configuration corresponds to a lowering command. In other cases the member for blocking the unidirectional fluid circulation line is in the open position. Circulation of fluid in said unidirectional fluid circulation line therefore enables a transfer of fluid from the lowering chamber to the lifting chamber of the lifting ram. This fluid flow comes to be added to the flow of fluid from the hydraulic fluid source, which enables the speed of lifting the load to be increased.

In accordance with one embodiment of the invention, the unidirectional fluid circulation line is equipped with a check valve for circulation of fluid only from the lowering chamber to the lifting chamber.

In accordance with one embodiment of the invention, the safety valve is a pressure-sensitive valve configured to go from the closed position to the open position as a function of the pressure in the second fluid connection. The safety valve is preferably a balancing valve or a controlled check valve.

BRIEF DESCRIPTION OF THE DRAWINGS

The invention will be better understood on reading the following description of embodiments given with reference to the appended drawings, in which.

DETAILED DESCRIPTION

Figure 1:
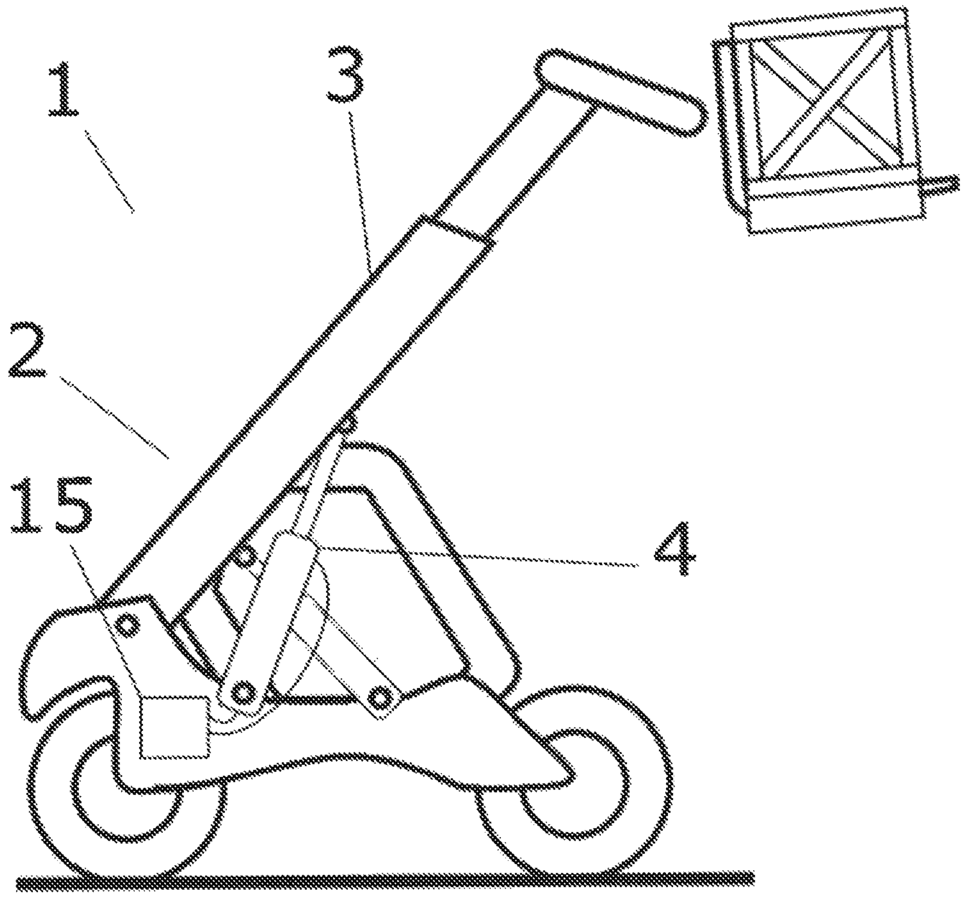
FIG. 1 represents a schematic view of a vehicle equipped with a load-handling device in accordance with the invention.

As mentioned hereinabove, the invention has for object a load-handling vehicle 1 that may take the form of a construction site vehicle, a farm vehicle, etc.

As in the example represented, this vehicle 1 includes for example a wheeled chassis equipped with a driver's cab of the vehicle and a propulsion unit for driving the vehicle over the ground.

The load-handling vehicle 1 further includes a load-handling device 2. This load-handling device 2 includes a load-handling member 3 that may take many forms. In the example represented the load-handling member 3 includes an arm carried by the chassis. This arm is provided at its end with a load-holding member that here takes the form of a fork that could likewise take the form of a bucket or other member.

The arm is a pivoting arm mounted to pivot about a so-called horizontal axis orthogonal to the longitudinal axis of the arm and parallel to a horizontal plane in which the vehicle 1 bears on the ground in the state with the vehicle 1 positioned on said plane. This arm is pivotable between a low position and a high position by means of an actuator here taking the form of a ram. This hydraulic ram for actuating the arm and in particular raising the arm, disposed between the arm and the wheeled chassis, is represented at 4 in the figures.

This ram 4 for raising the arm is controlled by means of a control member such as a joystick (not represented) disposed inside the driver's cab in a manner known in itself. This lifting ram 4 includes a lifting chamber 5, that is to say a chamber that when fed with fluid generates pivoting movement of the load-handling member 3 in the direction of raising the handling member 3, and a lowering chamber 6, that is to say a chamber which when fed with pressurized fluid generates a pivoting movement of the load-handling member 3 in the direction of lowering the load-handling member 3.

In the examples represented the lifting chamber 5 is disposed at the bottom of the body of the lifting ram 4 while the lowering chamber 6 is disposed on the piston rod side of the lifting ram 4.

To enable a lifting ram 4 of this kind to operate the load-handling device 2 includes a source 7 of hydraulic fluid. This source 7 of hydraulic fluid includes at least one hydraulic fluid distribution system 73, such as a distributor, a reservoir 72 and, in the example represented, a pump 71. Obviously, the handling vehicle 1 includes a control unit for the distribution system 73 and the pump 71 as a function of the manual actuation of the control member of the lifting ram 4 by the driver of the vehicle. The pump 71 is a hydraulic pump.

Figure 2:
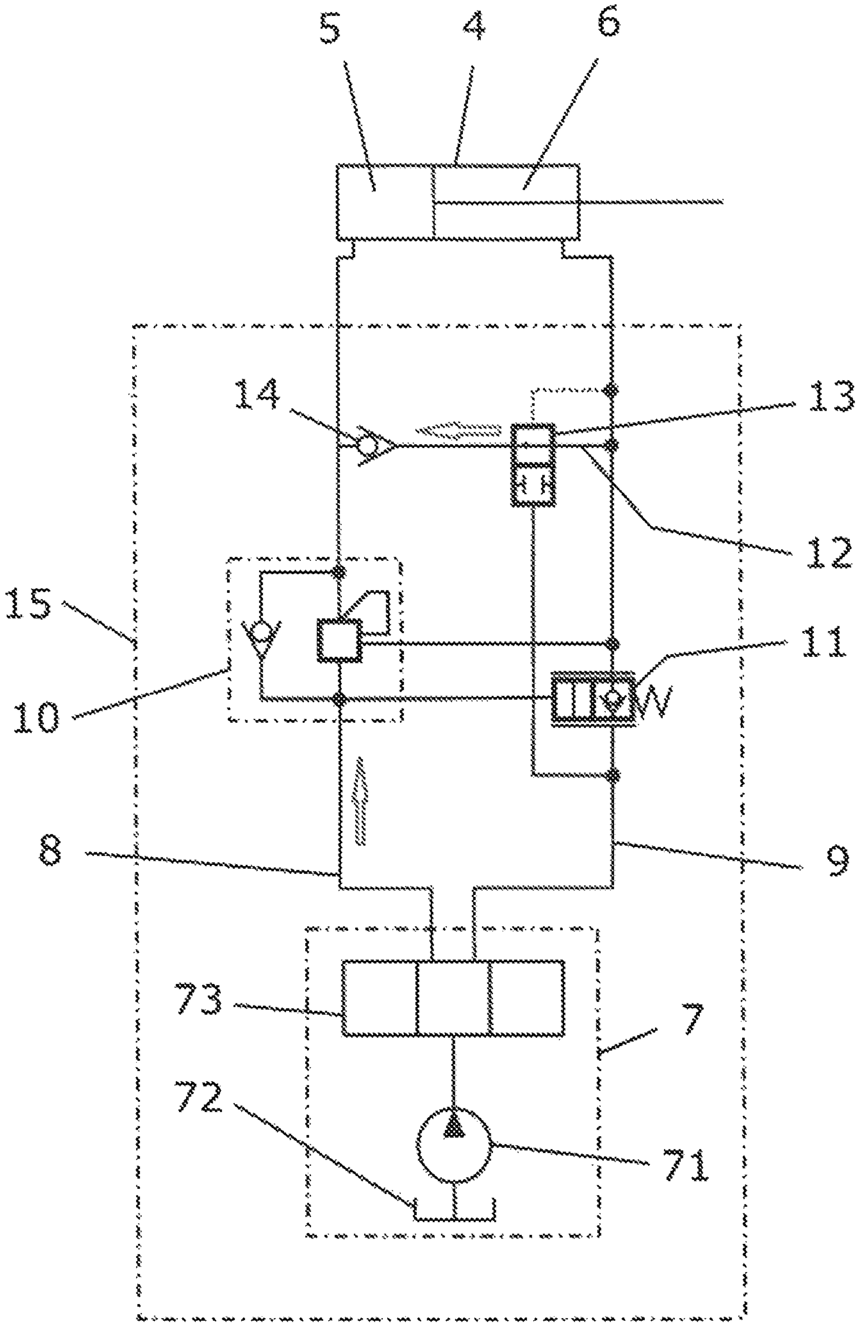
FIG. 2 represents a schematic partial view of the handling device during a phase of lifting with no load or with a load determined in accordance with the kinematics of the machine.
Figure 3:
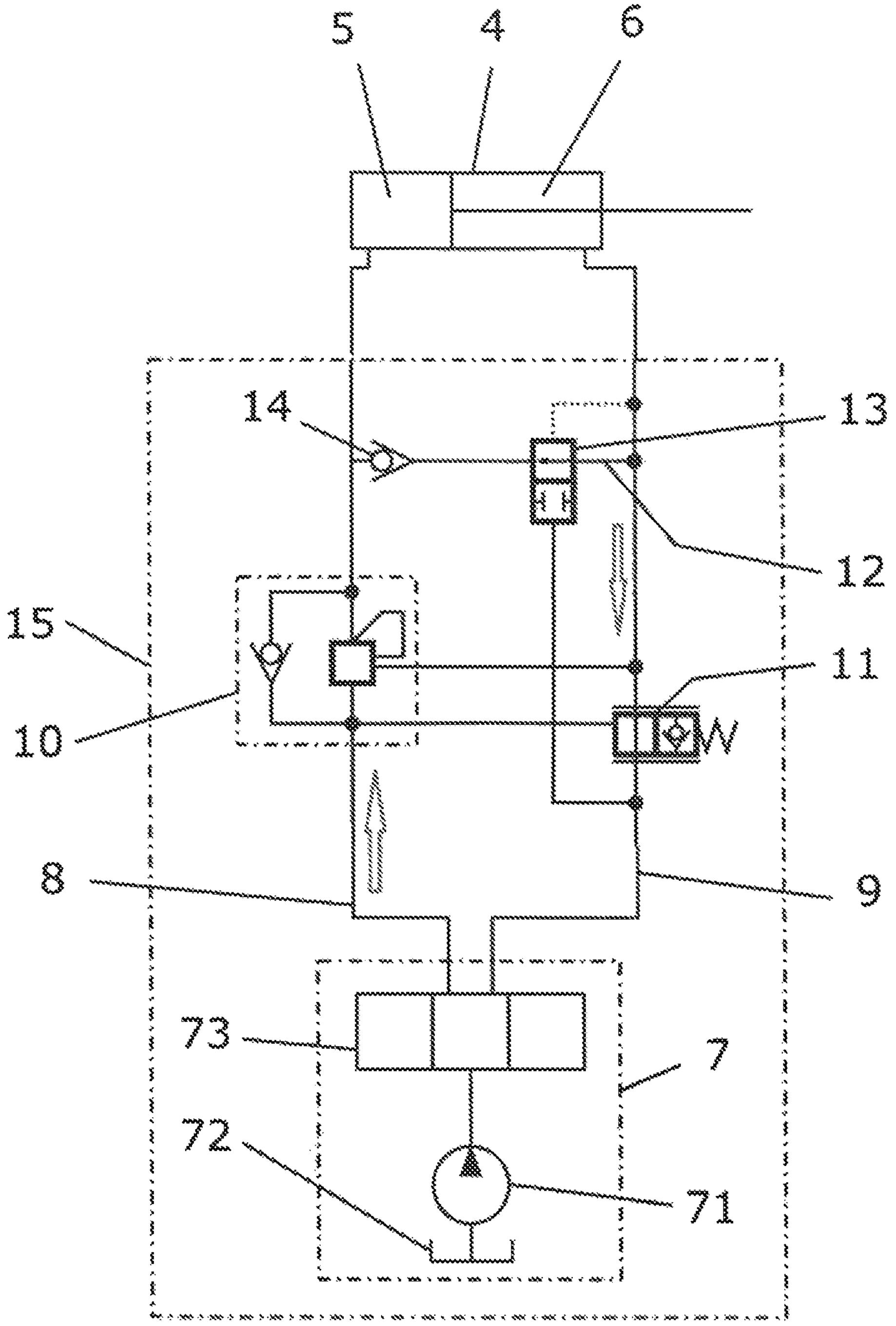
FIG. 3 represents a schematic partial view of the handling device during a phase of lifting a load.
Figure 4:
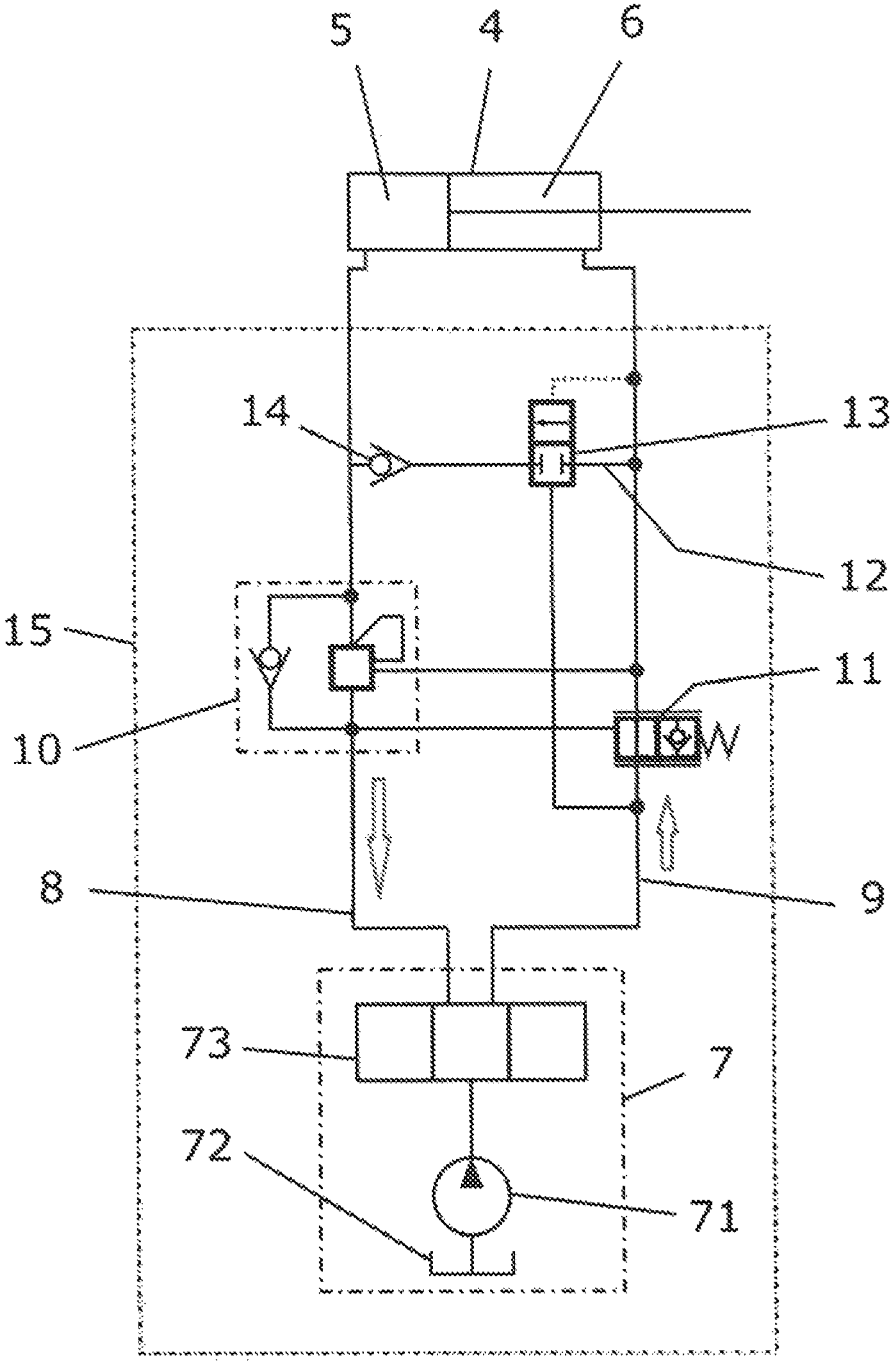
FIG. 4 represents a schematic partial view of the handling device during a phase of lowering with or without a load.

The load-handling device 2 further includes a first fluid connection 8 connecting the lifting chamber 5 of the lifting ram 4 with said source 7 of hydraulic fluid and a second fluid connection 9 connecting the lowering chamber 6 of the lifting ram 4 to said source 7 of hydraulic fluid. These first and second fluid connections are each made by means of pipes as illustrated in FIG. 2. These first and second fluid connections can then be supplied in turn with fluid under pressure by means of the pump 71 and the hydraulic fluid distribution system 73 of the hydraulic fluid source 7.

The first fluid connection 8 includes a pressure-sensitive safety valve 10. This safety valve 10 is always open in the direction of circulation of fluid from the source 7 of hydraulic fluid to the lifting chamber. This safety valve 10 is normally closed in the direction of circulation of the fluid from the lifting chamber 5 to the source 7 of hydraulic fluid to hold a driving load. This pressure-sensitive safety valve 10 is configured to go from the closed position to the open position as a function of the pressure in the second fluid connection 9 in the portion of the second fluid connection 9 extending between the lowering chamber and a valve to be described hereinafter. The safety valve 10 may be a balancing valve or a controlled check valve.

For its part the second fluid connection 9 includes a pressure-sensitive valve 11. This valve 11 is configured to go from the closed position to the open position as a function of the pressure in the first fluid connection 8 extending between the safety valve 10 and the hydraulic source 7. In the examples represented this valve 11 is a proportional valve configured to go from the closed position to the open position when the pressure in the portion of the first fluid connection 8 extending between the safety valve 10 and the fluid source 7 is greater than a predetermined value.

In the examples represented this valve 11 is a proportional 2/2 valve.

Finally, the load-handling device 2 further includes a fluid circulation line 12 connecting the first and second fluid connections 8, 9. This fluid circulation line 12 connects the portion of the second fluid connection 9 extending between the lowering chamber and the valve 11 with the portion of the first fluid connection 8 extending between the lifting chamber and the safety valve 10. This unidirectional fluid circulation line 12 imposes a circulation of fluid in said line exclusively from the lowering chamber 6 of the lifting ram 4 to the lifting chamber 5 of said lifting ram 4. Circulation in the opposite direction is prevented. To this end, the unidirectional fluid circulation line 12 is equipped with a check valve 14. This unidirectional fluid circulation line 12 is a line that can be blocked by means of at least one blocking member 13 equipping said line 12.

This blocking member 13 is a member mounted to be movable between an open position and a closed position and configured to go from the open position to the closed position as a function of the pressure in the portion of the second fluid connection 9 between the proportional valve 11 and the source 7 of hydraulic fluid. The member 13 for blocking the unidirectional fluid circulation line 12 is therefore configured to go from the open position to the closed position when the pressure in the portion of the second fluid connection 9 extending between the proportional valve 11 and the source 7 of hydraulic fluid is greater than a predetermined value. This configuration corresponds to the operator commanding a movement of lowering the load-handling member.

In the example represented this blocking member 13 is an on/off valve and the unidirectional fluid circulation line 12 takes the form of a fluid pipe connecting the first and second fluid connections. The first and second fluid connections 8 and 9 and the unidirectional fluid circulation line 12 form with the source 7 of hydraulic fluid the hydraulic control circuit of the lifting ram 4, this control circuit being designated 15 in FIG. 2.

For illustrative purposes, a method of operating the handling device 2 will be described.

Imagine that the load-handling member 3, that is to say the arm, is in the lowered position; the piston of the lifting ram 4 is therefore close to the bottom of the body of the lifting ram and the lifting chamber 5 is reduced to a small volume.

Using the control member of the lifting ram 4, the driver of the vehicle commands raising of the load-handling member 3.

The pump 71 and the distributor 73 of the source 7 of hydraulic fluid therefore feed the first fluid connection 8 with fluid in order to deploy the piston rod of the lifting ram 4 by filling the lifting chamber 5 with fluid.

If raising is effected with no load, that is to say in the absence of any load carried by the load-handling member 3, the proportional valve 11 of the second fluid connection 9 remains closed as long as the pressure in the portion of the first fluid connection 8 extending between the safety valve 10 and the hydraulic source 7 is less than a predetermined pressure value.

The flow of fluid leaving the lower chamber 6 of the lifting ram 4 is not able to return to the source 7 of fluid. The fluid then passes through the unidirectional fluid circulation line 12 to be added to the flow of fluid feeding the lifting chamber 5 and coming from the source 7 of hydraulic fluid. The speed of lifting the load therefore increases.

When raising is to the contrary effected with a load, that is to say when a load is carried by the load-handling member 3, in the same manner the lifting chamber of the lifting ram 4 is fed with fluid from the source 7 of hydraulic fluid. However, given the pressure conditions in the first fluid connection, the proportional valve 11 opens and operation is the conventional operation.

When the piston rod of the lifting ram 4 is deployed and the operator acts on the control member of the lifting ram 4 in the sense of withdrawing the piston rod of the lifting ram 4 in order to lower the load-handling member 3, the source 7 of hydraulic fluid feeds the second fluid connection 9 with fluid under pressure, a consequence of which is to close the unidirectional fluid circulation line by virtue of the member 13 for blocking said line going from the open position to the closed position.

Because of this, the flow leaving the source 7 of hydraulic fluid will feed the lowering chamber 6 of the lifting ram 4 and allow control of the safety valve 10 in the sense of opening said valve for the conventional operation of said safety valve 10.

The invention claimed is:

1. A load-handling vehicle comprising:

a load-handling member;

a hydraulic ram for raising the load-handling member, the hydraulic ram including a lifting chamber and a lowering chamber;

a source of hydraulic fluid;

a first fluid connection connecting the lifting chamber with the source of hydraulic fluid;

a second fluid connection connecting the lowering chamber with the source of hydraulic fluid;

a safety valve included along the first fluid connection, the safety valve being normally open in a direction of fluid circulation from the source of hydraulic fluid to the lifting chamber and normally closed in a direction of fluid circulation from the lifting chamber to the source of hydraulic fluid; and a load-handling device comprising:

a pressure-sensitive valve included along the second fluid connection, the pressure-sensitive valve configured to transition from a closed position to an open position as a function of a pressure in a portion of the first fluid connection extending between the safety valve and the source of hydraulic fluid;

a unidirectional fluid circulation line connecting the first and second fluid connections for looped circulation of fluid from the lowering chamber to the lifting chamber; and a blocking member for selectively blocking the unidirectional fluid circulation line, wherein the blocking member is configured to move between an open position and a closed position as a function of a pressure in a portion of the second fluid connection between the pressure-sensitive valve and the source of hydraulic fluid, wherein the pressure-sensitive valve is a proportional valve.

2. The load-handling vehicle of claim 1, wherein the pressure-sensitive valve is configured to transition from the closed position to the open position when the pressure in the portion of the first fluid connection extending between the safety valve and the source of fluid is greater than a predetermined pressure value.

3. The load-handling vehicle of claim 1, wherein the blocking member is configured to transition from the open position to the closed position when the pressure in the portion of the second fluid connection extending between the pressure-sensitive valve and the source of hydraulic fluid is greater than a predetermined pressure value.

4. The load-handling vehicle of claim 1, wherein the unidirectional fluid circulation line comprises a check valve.

5. The load-handling vehicle of claim 1, wherein the safety valve is configured to transition from a closed position to an open position as a function of the pressure in the second fluid connection.

6. A load-handling vehicle comprising:

a load-handling member;

a lifting ram for raising the load-handling member, the lifting ram including a lifting chamber and a lowering chamber;

a source of hydraulic fluid;

a first fluid connection that fluidly couples the lifting chamber with the source of hydraulic fluid;

a second fluid connection that fluidly couples the lowering chamber with the source of hydraulic fluid;

a pressure-sensitive valve disposed on the second fluid connection, the pressure-sensitive valve configured to transition from a closed position to an open position as a function of a pressure in a portion of the first fluid connection; and a fluid circulation line that fluidly couples the first fluid connection to the second fluid connection, wherein the pressure-sensitive valve remains closed when no load is carried by the load-handling member.

7. The load-handling vehicle of claim 6 further comprising a blocking member having an open position and a closed position, wherein the blocking member prevents fluid from flowing through the fluid circulation line when the blocking member is in the closed position.

8. The load-handling vehicle of claim 6 further comprising a check valve included along the fluid circulation line.

9. The load-handling vehicle of claim 6, further comprising a safety valve included along the first fluid connection, the safety valve being normally open in a direction from the source of hydraulic fluid to the lifting chamber and normally closed in a direction from the lifting chamber to the source of hydraulic fluid.

10. The load-handling vehicle of claim 9, wherein the safety valve comprises at least one of a balancing valve or a controlled check valve.

11. The load-handling vehicle of claim 6, wherein the source of hydraulic fluid comprises a pump.

12. A load-handling vehicle comprising:

a load-handling member;

a lifting ram for raising the load-handling member, the lifting ram including a lifting chamber and a lowering chamber;

a source of hydraulic fluid;

a first fluid connection that fluidly couples the lifting chamber with the source of hydraulic fluid;

a second fluid connection that fluidly couples the lowering chamber with the source of hydraulic fluid; and a load-handling device comprising:

a pressure-sensitive valve disposed on the second fluid connection, the pressure-sensitive valve configured to transition from a closed position to an open position as a function of a pressure in a portion of the first fluid connection, the pressure-sensitive valve being provided in the form of a proportional valve; and a fluid circulation line that fluidly couples the lowering chamber and lifting chamber.

13. The load-handling vehicle of claim 12 further comprising a blocking member for selectively blocking fluid from flowing through the fluid circulation line.

14. The load-handling vehicle of claim 12 further comprising a check valve included along the fluid circulation line to prevent fluid from flowing from the lifting chamber to the lowering chamber.

15. The load-handling vehicle of claim 12, wherein the pressure-sensitive valve remains closed when no load is carried by the load-handling member.

16. The load-handling vehicle of claim 12, wherein the pressure-sensitive valve is in the open position when a load is carried by the load-handling member.

17. The load-handling vehicle of claim 12, wherein the source of hydraulic fluid comprises a hydraulic fluid distribution system and a reservoir.

* * * * *